United States Patent [19]

Casparian

[11] Patent Number: 4,857,144
[45] Date of Patent: Aug. 15, 1989

[54] APPARATUS FOR IMPROVED TOP FEED DISTRIBUTION FOR FALLING FILM EVAPORATOR

[75] Inventor: Robert E. Casparian, Boonton, N.J.

[73] Assignee: Hanover Research Corporation, East Hanover, N.J.

[21] Appl. No.: 239,657

[22] Filed: Sep. 2, 1988

[51] Int. Cl.[4] ............................. B01D 1/06; B01D 1/22
[52] U.S. Cl. .................................... 159/13.2; 159/27.4; 159/43.1; 159/49; 165/159; 165/174; 202/237
[58] Field of Search ................... 159/13.2, 13.1, 13.3, 159/27.4, 27.2, 43.1, 49, 27.1; 202/237, 236; 165/174, 159

[56] References Cited

U.S. PATENT DOCUMENTS

| | | | |
|---|---|---|---|
| 709,172 | 9/1902 | Ordway | 159/27.1 |
| 828,524 | 8/1906 | Warren | 159/27.1 |
| 1,557,838 | 10/1925 | Hiller | 159/13.2 X |
| 1,872,554 | 8/1932 | Badger | 159/27.1 |
| 2,091,013 | 8/1937 | Rawlins | 159/27.1 |
| 2,545,028 | 3/1951 | Haldeman | 261/153 |
| 2,602,647 | 7/1952 | Miller | 165/1 |
| 2,655,347 | 10/1953 | Bielfeldt | 55/269 |
| 2,713,895 | 7/1955 | Eckstrom | 159/43.1 |
| 3,080,300 | 3/1963 | Smith | 203/88 |
| 3,175,962 | 3/1965 | Holtslag | 159/13.2 |
| 3,437,124 | 4/1969 | Bryan et al. | 159/13.2 |
| 4,154,642 | 5/1979 | Mattern et al. | 159/13.2 |

FOREIGN PATENT DOCUMENTS

| | | | |
|---|---|---|---|
| 837348 | 6/1981 | U.S.S.R. | 159/13.2 |
| 458963 | 12/1936 | United Kingdom | 159/13.2 |
| 895083 | 5/1962 | United Kingdom | 159/13.2 |

OTHER PUBLICATIONS

Frank et al.: Experimental Results of Rising Film Operations with Enhanced Heat Transfer Surfaces; p. 11, Oak Ridge Nat.l Ab. 3/1969.

*Primary Examiner*—Wilbur Bascomb
*Attorney, Agent, or Firm*—Richard L. Cannaday; John F. Smith; W. J. Ungvarsky

[57] ABSTRACT

An evaporator having a vertically mounted elongated tubular chamber, a pair of upper and lower tube sheets mounted near the ends of said tubular chamber, each tube sheet having a plurality of openings therein with a plurality of vertical evaporator tubes mounted between the pair of tube sheets, tangentially mounted inlet tubes between the upper tube sheet and a top cover for the tubular chamber, and an inverted cone mounted as a filler piece on the underside of the top cover and having its apex just slightly spaced from the upper tube sheet and its circumferential edge substantially spaced therefrom for effecting a uniform and even flow and distribution to the evaporator tubes of a liquid/solid mixture inputted into the tangential inlet tubes. The elongated tubular chamber is also provided with lateral inlet and outlet openings for inputting/outputting heated and subsequently cooled fluid to flow externally past the evaporator tubes. An opening at the bottom of the chamber is provided for egress of the dehydrated solids, as in the case of an aqueous solids feed material, which emerge after passage through the evaporator tubes. Usage of the whole apparatus as a chiller or cooler and condenser is considered, too.

20 Claims, 1 Drawing Sheet

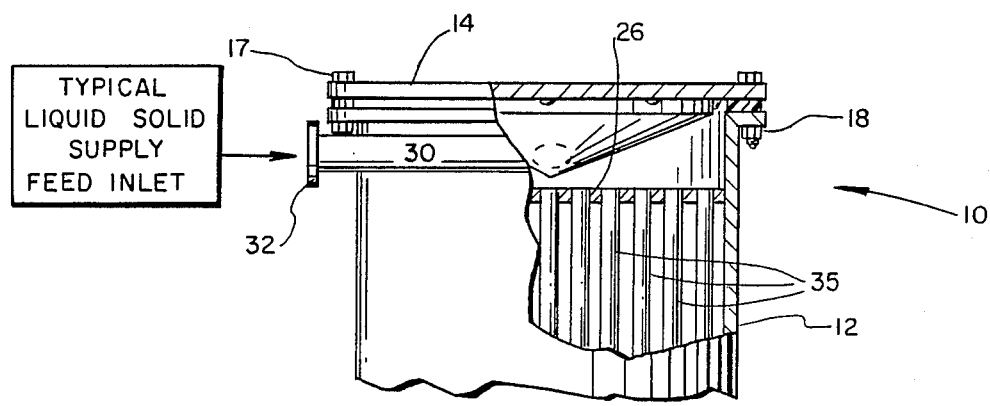
FIG. 1.
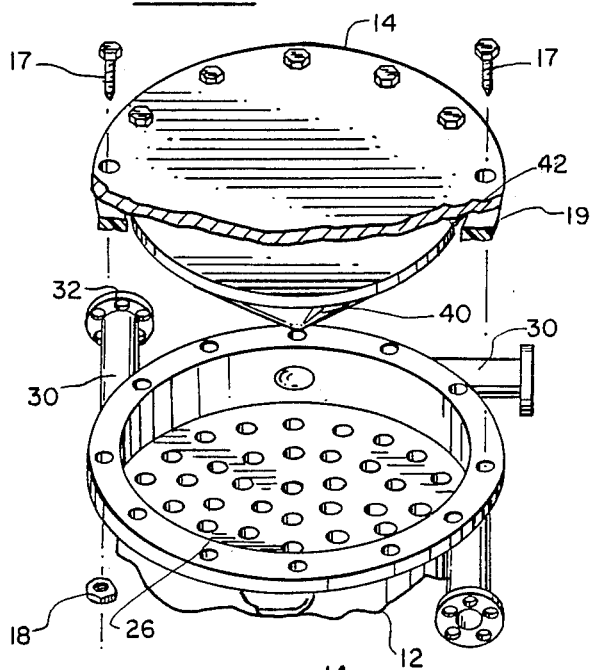
FIG. 2.
FIG. 3.
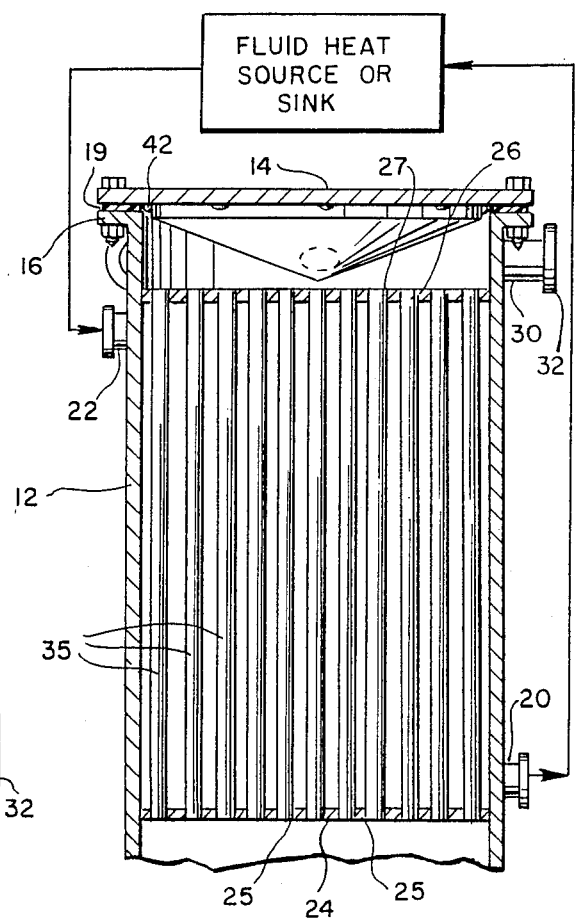
FIG. 4.

APPARATUS FOR IMPROVED TOP FEED DISTRIBUTION FOR FALLING FILM EVAPORATOR

BACKGROUND OF THE INVENTION

1. Field of the Invention

This invention relates generally to devices for heat exchanging, and especially to apparatus for improved top feed distribution for a falling film type evaporator in which a slurry, i.e., a liquid with solid particles, is heated. It may relate also to structurally similar devices for chilling or cooling and condensing.

2. Description of the Prior Art

A frequent problem with known devices of conventional type for driving off liquid from a slurry or mixture of a liquid or liquids with solid particles is that their rates of flow and hence speeds of processing are relatively slow. Another problem in tube-type evaporators operating on the falling film principle is that distribution of the feed mixture to the evaporator tubes is oftentimes not as even and/or as positive as desired.

Evaporator equipment of that kind generally of concern is shown at least schematically, for example, in U.S. Pat. No. 4,608,120 titled "Apparatus for Removing Light Oil From Solids".

SUMMARY OF THE INVENTION

The apparatus of the present invention is for a falling film evaporator or heat exchanger in which a multiplicity of tubes are vertically oriented within a main container or shell. The material to be evaporated or heated or, possibly, cooled, is frequently a mixture of solid particles and liquid commonly referred to as a slurry, which is introduced into the top of the heat exchange device. Preferably, a plurality of tangentially arranged input tubes of relatively small diameter are used to provide a steady and rapid input of the slurry feed. That slurry is introduced into the heat exchange or evaporator tubes at the tops thereof and falls by gravity along the interior walls or surfaces of those tubes to their bottoms, thus the name "falling film". A second fluid, gas or liquid, is caused to flow past the outside of the vertical tubes to heat or cool those tubes and their contents. Of course, appropriate inlet and outlet structure associated with the container is provided for that flow.

Another very important feature of the present invention is an inverted cone at the top of the container just above the input level or area of the vertical evaporator tubes. That cone effects an even and positive distribution of the slurry through that area above the upper ends of the evaporator tubes, and aids in the consistent flow of the slurry therethrough. Also, the evaporator tubes are preferably evenly spaced and of sufficient size to permit a fairly rapid rate of slurry flow through the heat exchange device. Tube spacing or arrangement may, quite commonly, be on a hexagonal pattern overall with local tube groupings being usually on either triangular or square pitches.

An object of the present invention is to provide a heat exchange structure or device having vertically mounted evaporator tubes within a main container or shell, the upper end of that container being closed, and input or feeding means as well as flow improving structure or means being installed at the upper end of the container for effecting even, positive distribution of a liquid/solid mixture into the vertical evaporator tubes. An appropriate outlet for that mixture is provided at the lower end of the container.

Another object of the present invention is to provide a heat exchange structure or device of high efficiency and rapid flow rate for effectively eliminating the water content of aqueous slurries passing therethrough by vaporization of that content or those contents.

A further object of the present invention is to provide a falling film evaporator having a top feed distribution structure including an inverted cone for evenly distributing a mixture for processing being inputted thereto.

A still further object of the present invention is to provide an improved input structure for a vertical tube or falling film type evaporator, that structure including a plurality of tangentially mounted input tubes at the feed inlet portion of the evaporator for improved feed mixture flow and distribution.

These and other objects and advantages of the present invention as well as its nature and substance will be more clearly perceived and fully understood by referring to the following description and claims considered together with the accompanying drawing in which like numbers designated like parts throughout.

BRIEF DESCRIPTION OF THE DRAWING

FIG. 1 is a side elevational view, partly in cross-section, of the upper portion of the apparatus of the present invention;

FIG. 2 is an exploded perspective view taken in partly fragmented cross-section across the upper portion of the apparatus of FIG. 1 looking downwardly at an angle thereto;

FIG. 3 is a top plan view of the apparatus of FIG. 1, and

FIG. 4 is a cross-sectional view in side elevation of the complete apparatus together with schematic depiction of heat exchange fluid input/output thereto and therefrom.

DESCRIPTION OF THE PREFERRED EMBODIMENT

Referring now to the drawing in detail, reference number 10 in FIG. 1 indicates in general the device or apparatus of the present invention, especially as disposed in relation to equipment items of generally conventional nature other than as associated with the invention. A main shell or container 12 of elongated tubular configuration shown most nearly completely in FIG. 4 supports and contains the various other elements of the device. A top cover 14, which can be removably attached to upper flange 16 of container 12, is provided to enclose or cap the upper end of the container. Attachment of a conventional nature using bolts 17, nuts 18 and a gasket 19 is shown.

Spaced a distance of usually only a few inches below top cover or cover plate 14 is a horizontal tube sheet 26. Near the lower end of the container 12 is a similar tube sheet 24. Each tube sheet 24 and 26 is provided wth a plurality of evenly distributed holes which may be according to a pattern and pitches aforesaid. Those holes are aligned from sheet to sheet for reception of vertical evaporator tubes 35 therein. As best seen in the view of FIG. 4, the evaporator tubes 35 are positively affixed and supported by the respective tube sheets 24 and 26 in the openings 25 and 27 thereof. A suitable means such as welding or the like may be used to permanently affix the tubes and sheets together. Otherwise the tubes may be conveniently removably installed by, for common examples, the use of ferrules or expansive rolling at their ends. Practically, for achievement of adequate flow, each heat exchange or evaporator tube is at least 1" in diameter.

The lower end of container 12, which in FIG. 4 is shown broken away below the lower tube sheet, may be mounted upon another tubular vessel or any other suitable receptacle for the solid products which emerge from the lower ends of the vertical evaporator tubes 35. For conventional comparative example see in FIG. 1 of aforementioned U.S. Pat. No. 4,608,120 the discharge of partially dehydrated slurry from the lower ends of the tubes of the evaporating or heating section of second stage evaporator 66 into the vapor chamber thereof. Shell or container 12 (present drawing) is provided with a heat exchange fluid outlet 20 and inlet 22, as indicated, together with a suitable source of fluid, as depicted schematically in FIG. 4.

An important feature or aspect of the present invention comprehended within the scope of reference number 10 is the plurality of tangential inlet tubes 30 mounted to discharge into container or shell 12 in the top region thereof between cover plate 14 and upper tube sheet 26, a region known generally as the upper or top channel. A slurry or liquid/solid supply to be heated and evaporated, or a liquid or even a gaseous material to be cooled and/or possibly condensed, is inputted into those respective inlet tubes 30, as depicted schematically in FIG. 1. The tubes themselves, four equally circumferentially spaced about shell 12 as shown, each preferably at least 2" in diameter, are visible to various extents in each of FIGS. 1, 2, 3 and 4. Their plural, tangential arrangement, which enhances even distribution of feed slurry across upper tube sheet 26 to heat exchange or evaporator tubes 35, is shown especially in FIGS. 2 and 3. Appropriate attachment flanges 32 are provided on tubes 30 for making connections to conventional type supply or input conduits not shown structurally. Without regard to the inlet tubes being tangential, there should be approximately thirty (30) heat exchange or evaporator tubes 35 per inlet tube.

A further very important feature of the present invention is the inverted cone filler 40 mounted underneath cover 14 in the area of container 12 where the feed slurry is inputted. That cone filler has the effect of reducing the height of the flow area for the slurry in its radial component of flow at the top of the container, and tends to direct the slurry downwardly and inwardly from the top channel circumferential periphery through which the feed inlet tubes discharge. It has been discovered that it is very desirable that the top channel, i.e., the space or region between the evaporator tube sheet 26 and the cover plate 14, have as small a volume as possible for good distribution of the feed slurry into the vertical tubes 35. One way of accomplishing that is by having a plurality of relatively small diameter feed inlet tubes 30 to accommodate the desired flow of material to be treated, thus permitting a top channel of low height still capable of accepting the tube outlets. Whatever the height of the top channel or top channel region, however, the volume of that region can be and by the present invention is reduced significantly by inverted cone filler 40.

Considering the situation without an inverted cone filler, as feed slurry descending into the outer heat exchange or evaporator tubes 35, i.e., the tubes relatively near the inner surface of shell or container 12, departs from the inputted mass the remaining feed material flowing toward the upper ends of the evaporator tubes nearer the center of shell 12 may have a substantially reduced flow velocity as the transverse flow area "seen" by that material on a radial or diametral line remains constant in height although decreasing in length or circumference. With inverted cone filler 40 installed, however, the height of the described transverse flow area as well as its length decreases continuously inwardly, and velocity of the steadily decreasing mass flow is maintained. That helps insure that adequate feed material does indeed reach the inner or center tubes; that is, that those tubes are not starved of feed, possibly even running dry, while the outer or peripheral tubes receive more than their intended feed flow. Thus overall efficiency is improved as the heat exchange or evaporator tube surfaces are loaded properly throughout.

Inverted cone filler 40 is attached to and supported from top cover plate 14, and hence is removable with that plate when access to the top channel region is desired for cleaning or any other purpose. In the embodiment shown, attachment of the inverted cone filler to the top cover plate is by means of a deposit or bead of welding material 42 at the circumferential edge of the cone filler abutting the underside of the cover plate. Another acceptable means of attachment would be a headed bolt passing downwardly through the center of cover plate 14 and threading into a boss at the inner peak of cone filler 40. In a reverse arrangement, with no particular securing or attaching arrangement being critical, a stud could be fitted in the cone filler to come up through the top cover plate with a nut or nuts applied to a threaded portion of that stud beyond the cover plate and tightened against the upper surface of that plate. Possibly, too, although probably less conveniently, inverted cone filler 40 could be independent of the top cover plate by being flanged to be supported on flange 16 of shell or container 12.

At any rate, as concerned elements are positioned according especially to FIGS. 1 and 4 without restriction as to system or means, the outer peak or apex of inverted cone filler 40 should be spaced approximately one heat exchange tube diameter (one diameter of representative tube 35) from the adjacent tube sheet (upper surface of tube sheet 26), while the circumferential edge of the inverted cone filler should be spaced approximately one and one half inlet tube diameters (one and one half diameters of representative tube 30) from the adjacent tube sheet.

The present invention has been applied with beneficial results to the last or drying stage of a multi-stage evaporator array in a leather dye waste processing plant of commercial size on at least an experimental basis. The evaporator shell or container diameter of the concerned last stage was 33", and the enclosed tube bundle consisted of 180 evenly distributed tubes each of 1 ½" diameter. The material fed to the tubes to be evaporated, i.e., freed of water or finally dried, therein was, representatively, a slurry or mixture of approximately 77.7% oil, 18% solids such as NaCl, and approximately 1.3% other, organic matter, mixed with 2.9% $H_2O$ (15% on a non-oil basis). Overall feed rate was 810 gallons per minute giving a desired loading or flow of 4½ gallons per minute per evaporator tube.

As the concerned evaporator stage was constructed originally, all feed material entered through a single, downwardly directed pipe or conduit opening centrally through the top channel cover which was of somewhat pyramidal or crowned configuration. Within the top channel region was an altogether conventional arrangement of a feed distribution basket aligned axially with the feed inlet flow direction and a velocity impact baffle within the feed distribution basket somewhat below the open upper end thereof, of somewhat smaller diameter than the interior of the basket and aligned transversely to the feed inlet flow direction. The lateral wall of the feed distribution basket was imperforate while at its lower end that basket was closed with a perforated plate disposed parallel and in spaced relation to the upper tube sheet.

In operation the evaporator stage just described experienced difficulty with solids piling up in and blocking further slurry flow through the central region of the perforated plate at the lower end of the feed distribution basket; that is, blocking flow through a region of the perforated plate generally aligned with the velocity impact baffle above that plate. Slurry flow was thus substantially forced out to an annular region at the periphery of the perforated plate so that the peripheral evaporator tubes opening through the upper tube sheet were overfed with slurry while the tubes nearer to and at the center of that tube sheet were starved of feed. Overall performance of the evaporator was impaired significantly.

For remedy the upper end of the concerned evaporator was reconstructed essentially according to the showings of present FIGS. 1 through 4. The original single, vertically downwardly oriented feed conduit was replaced with four tangentially disposed and evenly spaced feed tubes each 4" in diameter. The feed distribution basket and velocity impact baffle were replaced with an inverted cone filler. That filler had its apex about 1½" above the upper surface of the upper tube sheet, and its outer peripheral edge was spaced about 6" from that surface. With changes so made, the evaporator was operated with the feed material and at the feed rate recited above. Results of an appreciably improved nature were achieved in that accumulation of solids on or above the upper tube sheet was avoided and substantially even distribution of feed material to all of the evaporator tubes was obtained.

Protection by Letters Patent of this invention in all its aspects as the same are set forth in the appended claims is sought to the broadest extent that the prior art allows.

I claim as my invention:

1. A heat exchange device comprising:
   a hollow container having one end and another end, one of those ends being adapted to serve as a top end;
   a closure cap at the end of said hollow container adapted to serve as a top end;
   spaced tube sheets affixed transversely across the inside of said container near the respective ends thereof;
   a plurality of heat exchange tubes mounted longitudinally between said transverse tube sheets and opening through them;
   input means at the cap end of said hollow container for feeding a fluid for thermal treatment into a top channel region of said container between said cap and the nearest tube sheet;
   means for improving the flow of said fluid material for thermal treatment from said top channel region into said heat exchange tubes, that means including an inverted, imperforate cone filler mounted in said top channel region, the downwardly projected area of said cone filler being substantially the same as the area of the tube sheet directly below it including the aggregate area of openings through that sheet for heat exchange tubes, and
   means for effecting a flow of heat exchange fluid about said heat exchange tubes.

2. The heat exchange device of claim 1 wherein said hollow container is cylindrical and said input means at the cap end thereof includes at least one tangentially mounted inlet tube.

3. The heat exchange device of claim 2 wherein said input means comprises a plurality of tangentially mounted inlet tubes.

4. The heat exchange device of claim 3 wherein each of said plurality of inlet tubes is 2" or more in diameter.

5. The heat exchange device of claim 1 wherein the apex of said inverted cone filler is spaced approximately one heat exchange tube diameter from the adjacent tube sheet.

6. The heat exchange device of claim 1 wherein said input means at the cap end of said hollow container includes at least one inlet tube and the circumferential edge of said inverted cone filler is spaced approximately one and one half inlet tube diameters from the adjacent tube sheet.

7. The heat exchange device of claim 1 wherein said heat exchange tubes are distributed evenly within said hollow container between said tube sheets.

8. The heat exchange device of claim 7 wherein said input means at the cap end of said hollow container includes at least one inlet tube and there are approximately 30 of said heat exchange tubes per inlet tube.

9. The heat exchange device of claim 7 wherein each of said heat exchange tubes is 1" or more in diameter.

10. The heat exchange device of claim 7 wherein said input means at the cap end of said hollow container includes at least one tangentially mounted inlet tube.

11. The heat exchange device of claim 10 wherein said input means comprises four tangentially mounted inlet tubes.

12. The heat exchange device of claim 7 wherein the apex of said inverted cone filler is spaced approximately one heat exchange tube diameter from the adjacent tube sheet, and wherein said input means at the cap end of said hollow container includes at least one inlet tube and the circumferential edge of said inverted cone filler is spaced approximately one and one half inlet tube diameters from the adjacent tube sheet.

13. An evaporator comprising:
   an elongated tubular chamber having one end and another end, and arranged for vertical mounting with one of said ends adapted to serve as a top end;
   a pair of upper and lower tube sheets affixed transversely within said chamber near its respective ends, each of said tube sheets being characterized by a plurality of openings;
   a plurality of vertical heat exchange tubes mounted in said openings between said upper and lower tube sheets;
   means for inputting/outputting heated fluid into and from said chamber between said tube sheets so that that fluid will flow externally of said plurality of vertical heat exchange tubes;
   a cover at the top end of said elongated tubular chamber in spaced relation to said upper tube sheet defining a top channel region therebetween;
   means for inputting a fluid material to be evaporated into said top channel region, and means for effecting even distribution and flow from said top channel region into said heat exchange tubes of said fluid material to be evaporated, that means including an inverted, imperforate cone filler mounted in said top channel region, the downwardly projected area of said cone filler being substantially the same as the area of the tube sheet directly below it including the aggregate area of openings through that sheet for heat exchange tubes.

14. The evaporator of claim 13 wherein said means for inputting a fluid material to be evaporated into said top channel region comprises a plurality of tangentially mounted inlet tubes, and each of those tubes is 2" or more in diameter.

15. The evaporator of claim 13 wherein said heat exchange tubes are distributed evenly within said elongated tubular chamber between said tube sheets.

16. The evaporator of claim 15 wherein each of said heat exchange tubes is 1" or more in diameter.

17. The evaporator of claim 15 wherein said means for inputting a fluid material to be evaporated into said top channel region comprises at least one inlet tube, and there are approximately 30 of said heat exchange tubes per inlet tube.

18. The evaporator of claim 13 wherein the apex of said inverted cone filler is spaced approximately one heat exchange tube diameter from said upper tube sheet, and wherein said means for inputting a fluid material to be evaporated into said top channel region comprises at least one inlet tube and the circumferential edge of said inverted cone filler is spaced approximately one and one half inlet tube diameters from said upper tube sheet.

19. The evaporator of claim 13 wherein said inverted cone filler is attached to and supported from said cover.

20. The evaporator of claim 19 wherein said inverted cone filler is attached to said cover by welding.

* * * * *